Patented May 15, 1951

2,553,502

UNITED STATES PATENT OFFICE 2,553,502

2,2'-DIMETHYL-4,4'-BITHIAZOLE AND A PROCESS OF PREPARING THE SAME

Lee C. Hensley, Binghamton, N. Y., assignor to General Aniline & Film Corporation, New York, N. Y., a corporation of Delaware No Drawing. Application April 18, 1950, Serial No. 156,709

4 Claims. (Cl. 260—302)

This invention relates to 2,2'-dimethyl-4,4'-bithiazole and to a process of preparing the same.

In the preparation of cyanine sensitizing dyes, several heterocyclic bases having two methyl groups have been used in the form of their diquaternary salts to obtain asymmetrical dyestuffs with varying degrees of sensitizing activity and sensitizing ranges. The diquaternary dyestuffs obtained from the dye salts of these bases have a tendency to diffuse in a gelatin layer. Dyes of this category are illustrated, for example, in United States Patents 1,994,170 and 2,108,845. Organic bases with two heterocyclic nuclei, i. e., 2,2' - dimethyl - 6,6' - bibenzoxazole and 2,6-dimethylbenzo[1,2,5,4]bisthiazole, referred to in United States Patents 2,058,725 and 2,202,991, have two methyl groups, only one of which is capable of condensing with a nitrogenous heterocyclic dye salt.

The problem on hand was to find a heterocyclic base having two methyl groups both of which, after quaternization of the base, would be capable of condensing with a nitrogenous heterocyclic dye salt to yield diquaternary dyestuffs which are not only sensitizers for both orthochromatic and panchromatic emulsions, but also as sensitizers for color film which would be unaffected by the presence of a color component and exhibit the property of non-migration from the layer in which they are incorporated.

Prior literature references to such bases are confined to bithiazolyls. Erlenmeyer and Ueberwasser, Helv. Chim. Acta. 22, 938–9 describe the condensation of thioformamide with 1,4-dibromodiacetyl to yield 4,4'-bithiazolyl. Zerweck and Schwamberger, German Patent 650,050 (Swiss Patent 195,323 and British Patent 478,549) discloses 2,2'-bithiazolyls in which the 4,4- and 4',5'-positions are fused to an aromatic ring. Swiss Patent 238,517 discloses 4,4'-dimethyl-2,2'-bithiazole of the following formula:

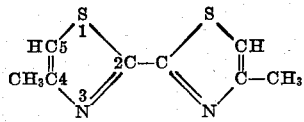

The two methyl groups in the latter compound are unreactive because they are not connected to a carbon doubly bonded nitrogen.

Accordingly, it is an object of the present invention to provide a heterocyclic base of the 4,4'-bithiazole type having a methyl group in each of the 2,2'-positions, both of which are reactive with any one of the nitrogenous heterocyclic dye salts of the type used in cyanine dyes to yield symmetrical tetranuclear dyestuffs.

A further object is to provide a process for the synthesis of 2,2'-dimethyl-4,4'-bithiazole.

Other objects and advantages will appear hereinafter.

I have discovered that 2,2'-dimethyl-4,4'-bithiazole is readily prepared by condensing a molecular equivalent of 1,4-dibromobutanedione-2,3 with two molecular equivalents of thioacetamide in the presence of a lower alcohol as a solvent-diluent, such as, for example, methanol, ethanol, isopropanol, and the like. The condensation reaction is carried out by simply dissolving the coreactants in a sufficient quantity of a lower alcohol to effect solution and heating the solution either on the steam bath or under reflux for a period of time ranging from 5 to 15 minutes. The heated mixture (after a solid had separated) is poured into a volume of water corresponding to 4 to 6 times the volume of alcohol employed. The aqueous mixture is made acid with dilute hydrochloric acid and filtered. Upon neutralization with any inorganic alkali a brownish solid appears in the filtrate. The solid 2,2'-dimethyl-4,4'-bithiazole is filtered off and recrystallized from any one of the lower alcohols employed as a solvent-diluent.

The following example describes in detail the method of accomplishing the above objects but it is to be understood that it is inserted merely for the purpose of illustration and is not to be construed as limiting the scope of the invention.

Example

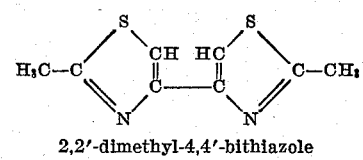

2,2'-dimethyl-4,4'-bithiazole

One gram of 1,4-dibromobutanedione-2,3 and 0.63 gram of thioacetamide were dissolved in 20 cc. of absolute methanol and warmed for 10 minutes on the steam bath. The mixture (a solid had separated) was poured into 100 cc. of water. The aqueous mixture was made acid with dilute hydrochloride and filtered. Upon neutralization, a brownish solid appeared in the filtrate. The solid was filtered off and recrystallized from methanol. The recrystallized product has a melting point of 165° C.

The quaternization of the 2,2'-dimethyl-4,4'-bithiazole is effectuated by fusion with an alkyl or aralkyl halide or by heating the base with an alkyl or aralkyl halide in a sealed tube in a water bath under increased pressure in the usual manner. The alkylating agent employed may be methyl or ethyl iodide, dimethyl or diethyl sulfate, methyl p-toluenesulfonate, phenethyl iodide, and the like.

The quaternated bithiazole dye salts are useful in the preparation of symmetrical tetranuclear cyanine dyes which are obtained by condensing 1 mol of a cyclammonium quaternary dye salt of 2,2'-dimethyl-4,4'-bithiazole with 2 mols of a cyclammonium quaternary cyanine dye intermediate of the type used in the preparation of cyanine dyes in the presence of an acid binding agent, as disclosed in my copending application Serial No. 67,075, filed on December 23, 1948, now abandoned. The tetranuclear cyanine dyes thus obtained are unaffected in the presence of color coupling components. In the latter combination, the sensitizing action of the dyestuff is not impaired or diminished and an additional advantage of these dyestuffs is their ability to remain fixed in the layer in which they are originally deposited.

From the foregoing description, it is clearly evident that the 2,2'-dimethyl-4,4'-bithiazole is not only useful as an intermediate for the preparation of symmetrical tetranuclear cyanine and carbocyanine dyes but also for the preparation of merocyanine dyes in which the central nucleus, 4,4'-bithiazole, is linked to an N-substituted ketomethylene heterocyclic nucleus, such as an alkylrhodanine, by a dimethine chain.

While I have pointed out above certain preferred embodiments of the invention, the same is not limited to the foregoing example or to the specific details given heretofore but is capable of variations and modifications as to proportions and conditions employed. Accordingly, it is intended that the invention be defined only by the accompanying claims.

I claim:

1. A 2,2'-dimethyl-4,4'-bithazole of the following formula:

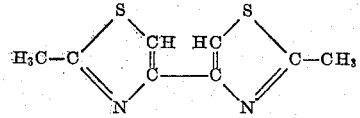

2. The process of preparing 2,2'-dimethyl-4,4'-bithiazole which comprises condensing one mol of 1,4-dibromobutanedione-2,3 with one mol of thioacetamide in the presence of a lower alcohol as a solvent-diluent.

3. The process according to claim 2 wherein the condensation reaction is carried out by heating the 1,4-dibromobutanedione-2,3 and thioacetamide on the steam bath.

4. The process according to claim 2 wherein the lower alcohol solvent-diluent is methanol.

LEE C. HENSLEY.

No references cited.